US006250471B1

(12) United States Patent
Ruthven et al.

(10) Patent No.: US 6,250,471 B1
(45) Date of Patent: Jun. 26, 2001

(54) SORTING APPARATUSES AND SORTING METHODS

(75) Inventors: Robert E. Ruthven, College Place; Quentin F. Kemph, Walla Walla, both of WA (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 09/256,528

(22) Filed: Feb. 24, 1999

(51) Int. Cl.[7] .......................... B07B 15/00; B65G 31/00

(52) U.S. Cl. ........................ 209/12.1; 209/639; 209/577; 209/920; 209/932; 198/638; 198/766

(58) Field of Search .................................. 209/12.1, 638, 209/639, 644, 577, 587, 920, 932, 938, 939; 198/752.1, 759, 763, 766, 638

(56) References Cited

U.S. PATENT DOCUMENTS

| | | | |
|---|---|---|---|
| 2,876,891 | 3/1959 | Long et al. . | |
| 2,951,581 | 9/1960 | Long et al. . | |
| 3,002,617 * | 10/1961 | Fraenkel | 209/639 X |
| 3,380,572 | 4/1968 | Luger . | |
| 3,975,263 | 8/1976 | Elo . | |
| 4,313,535 | 2/1982 | Carmichael . | |
| 4,569,446 * | 2/1986 | Kelley | 209/920 X |
| 4,701,256 | 10/1987 | Cross, Jr. . | |
| 4,755,284 | 7/1988 | Brooks et al. . | |
| 4,895,174 | 1/1990 | Henderson et al. . | |
| 4,915,824 | 4/1990 | Surtees . | |
| 5,037,536 | 8/1991 | Koch et al. . | |
| 5,297,667 | 3/1994 | Hoffman et al. . | |
| 5,339,964 | 8/1994 | Gray et al. . | |
| 5,358,122 | 10/1994 | Surtees . | |
| 5,394,893 | 3/1995 | Coleman et al. . | |
| 5,400,908 * | 3/1995 | Prestwood | 209/639 X |
| 5,403,235 | 4/1995 | Baumgarten et al. . | |
| 5,411,142 | 5/1995 | Abbott et al. . | |
| 5,431,289 | 7/1995 | Hoffman . | |
| 5,460,189 | 10/1995 | Coleman et al. . | |
| 5,476,109 | 12/1995 | Coleman et al. . | |
| 5,526,437 | 6/1996 | West . | |

(List continued on next page.)

FOREIGN PATENT DOCUMENTS 5-64771 * 3/1993 (JP) .................................... 209/639

OTHER PUBLICATIONS

EXAIR Corporation, *EXAIR–Knife,* pp. 35–36 and 38.

*Primary Examiner*—Tuan N. Nguyen
(74) *Attorney, Agent, or Firm*—Wells, St. John, Roberts, Gregory, & Matkin, P.S.

(57) ABSTRACT

The present invention relates to sorting apparatuses and sorting methods. According to one aspect of the present invention, a sorting apparatus includes an intake section configured to receive plural articles to be sorted; an exhaust section located downstream of the intake section; and an air manifold adjacent the intake section and positioned to emit an air stream in a generally downstream direction and wherein the articles move in a given direction of movement, and the emitted air stream sorts at least some articles from remaining articles and directs the at least some articles in the downstream direction from the intake section to the exhaust section. A sorting method according to one aspect of the invention includes providing a sorter; receiving plural articles to be sorted within the sorter; moving the articles along discrete courses of travel in a given direction within the sorter; subjecting the articles to an air stream substantially parallel to the direction of movement of the articles and in an area defined between the discrete courses of travel to sort at least some articles from remaining articles and wherein the sorting occurs in the area defined between the discrete courses of travel; and exhausting the at least some articles.

8 Claims, 4 Drawing Sheets

U.S. PATENT DOCUMENTS

| | | | |
|---|---|---|---|
| 5,579,920 | | 12/1996 | Garabedian et al. . |
| 5,713,456 | * | 2/1998 | Haimberger et al. ............ 198/641 X |
| 5,727,690 | | 3/1998 | Hofmeister . |
| 5,735,403 | | 4/1998 | Stiglianese . |
| 5,788,727 | | 8/1998 | Barthelmess . |
| 5,800,578 | | 9/1998 | Johnson . |
| 5,865,990 | * | 2/1999 | Novak et al. ........................ 209/579 |

* cited by examiner

SORTING APPARATUSES AND SORTING METHODS

TECHNICAL FIELD

The present invention relates to sorting apparatuses and sorting methods.

BACKGROUND OF THE INVENTION

Vibratory conveying systems are known in the art. A vibratory drive is connected to the conveying frame or bed in exemplary conventional vibratory conveying systems. Some experimentation has been conducted wherein the vibratory device is connected to a support frame and the support frame is excited or primarily vibrated with the vibration being transferred through springs indirectly to the conveying member or bed. Exemplary conventional systems are described in U.S. Pat. Nos. 2,876,891, 2,951,581 and 3,380,572, which are incorporated herein by reference.

Newer designs have provided a system wherein the vibration amplitude of the excited frame approaches zero while the conveyor bed or member is vibrated at its natural frequency of maximum amplitude. The generally recognized advantages of such systems over conventional direct vibratory conveyors are that it is possible under some conditions to transfer less vibration into the floor or ceiling supports and to provide a conveyor that is considerably less massive than direct drive vibrating systems.

U.S. Pat. No. 4,313,535, incorporated herein by reference, teaches an improved excited frame vibratory conveying apparatus for moving particulate material. Plural supports or springs space a conveyor member from the excited frame. The device of the '535 patent teaches a vibratory drive means mounted to an elongated conveying frame for vibrating the elongated conveying frame in an intended direction for conveying particulate material. The drive means produces a vibratory motion along a linear line of force. The device of the '535 patent provides a configuration for operation over a relatively large range of loads without any appreciable vibration of the excited frame.

Such systems are preferably configured for use with various types of particulate material. For example, one conveying apparatus can be configured to convey one type of material in one application and another similar conveying apparatus can be configured to convey another material in another application. It may be desired to vary the amount of vibration of the conveyor member corresponding to the type of particulate matter being conveyed. In particular, it may be necessary to increase or decrease the amplitude of vibration of the conveyor member corresponding to a particular application.

While the effectiveness of such systems to convey particulate material has been clearly demonstrated, there may exist a desire for some applications to separate or sort the particulate material or articles. For example, the articles may comprise desirable as well as undesirable product. Accordingly, in some applications it may be preferable to separate the material for further processing or packaging. Thus, there exists a need to provide a system which can be utilized to effectively sort the material or articles to facilitate processing and overall production.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
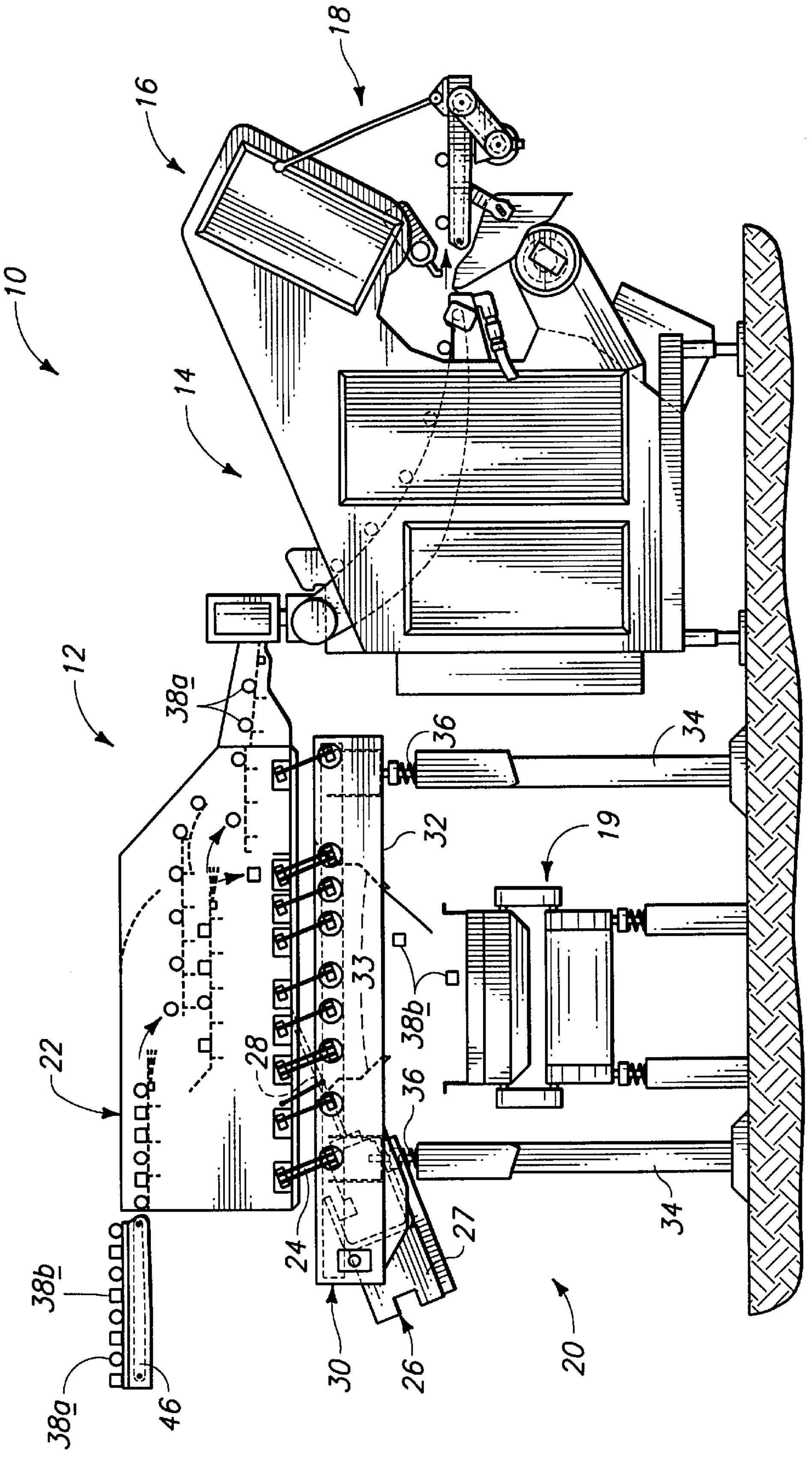
FIG. 1 is a schematic representation of one embodiment of a sorting apparatus according to one aspect of the present invention.

This disclosure of the invention is submitted in furtherance of the constitutional purposes of the U.S. Patent Laws "to promote the progress of science and useful arts" (Article 1, Section 8).

According to one aspect of the present invention, a sorting apparatus comprises: an intake section configured to receive plural articles to be sorted; an exhaust section located downstream of the intake section; and an air manifold adjacent the intake section and positioned to emit an air stream in a generally downstream direction and wherein the articles move in a given direction of movement, and the emitted air stream sorts at least some articles from remaining articles and directs the at least some articles in the downstream direction from the intake section to the exhaust section.

According to a second aspect, a sorting apparatus comprises: an is intake section configured to receive plural articles to be sorted; an exhaust section located downstream of the intake section; a first air manifold configured to emit an air stream to sort at least some articles from remaining articles and direct the at least some articles from the intake section to the exhaust section; an intermediate section located downstream of the intake section and upstream of the exhaust section and which is configured to receive the remaining articles; and a second air manifold configured to emit an air stream to sort at least some additional articles from the remaining articles and direct the at least some additional articles from the intermediate section to the exhaust section.

Another aspect of the present invention provides a sorting apparatus comprising: a base member; a sorter housing having an intake section configured to receive plural articles to be sorted; an exhaust section located downstream of the intake section; and an air manifold positioned adjacent the intake section and configured to emit an air stream in a direction substantially parallel to a direction of movement of the articles to sort at least some articles from remaining articles and direct the at least some articles from the intake section to the exhaust section; at least one resilient support coupled intermediate the base member and the sorter housing; and a drive device operable to impart movement to the sorter housing.

According to another aspect, a sorting apparatus comprises: a first sorter configured to receive plural articles to be sorted and define a plurality of discrete courses of travel for the articles, the first sorter having an air manifold configured to emit an air stream intermediate adjacent courses of travel in a generally downstream direction to sort at least some articles according to a first product characteristic from remaining articles and direct the at least some articles intermediate adjacent courses of travel; a stabilization device located downstream of the first sorter and configured to stabilize the at least some articles received from the first sorter; a second sorter located downstream of the stabilization device and configured to sort at least some additional articles from the stabilized articles according to a second product characteristic; and a take-away device located downstream of the second sorter and configured to transport the at least some additional articles.

Another aspect of the present invention provides a sorting apparatus comprising: a base member; a sorter housing having an intake section configured to receive plural articles to be sorted and to define a substantially horizontal course of travel for the articles; an exhaust section located downstream of and elevationally below the intake section and configured to define a substantially horizontal course of travel for the articles; a first air manifold configured to emit a substantially horizontal air stream to sort at least some articles from remaining articles and direct the at least some articles from the intake section to the exhaust section; an intermediate section located downstream of and elevationally below the intake section and upstream of and elevationally above the exhaust section and which is configured to receive the remaining articles and to define a substantially horizontal course of travel for the remaining articles; and a second air manifold configured to emit a substantially horizontal air stream to sort at least some additional articles from the remaining articles and direct the at least some additional articles from the intermediate section to the exhaust section; a plurality of resilient supports coupled intermediate the base member and the sorter housing; and a drive device disposed in force transmitting relation relative to the base member to impart vibratory movement to the sorter housing.

A sorting method according to one aspect of the invention comprises: providing a sorter; receiving plural articles to be sorted within the sorter; moving the articles along discrete courses of travel in a given direction within the sorter; subjecting the articles to an air stream substantially parallel to the direction of movement of the articles and in an area defined between the discrete courses of travel to sort at least some articles from remaining articles and wherein the sorting occurs in the area defined between the discrete courses of travel; and exhausting the at least some articles.

Another sorting method comprises: providing a sorter; receiving plural articles to be sorted within the sorter; moving the articles in a given direction within the sorter; subjecting the articles to an air stream to sort at least some articles from remaining articles; subjecting the at least some articles to another air stream to sort at least some additional articles from the remaining articles; and exhausting the at least some articles and the at least some additional articles.

Referring to FIG. 1, a sorting apparatus generally designated with the numeral 10 is illustrated. The depicted embodiment of sorting apparatus 10 is configured to move and sort received articles. Exemplary articles include agricultural products, such as lettuce or other leafy products. Sorting apparatus 10 can be utilized in other applications to convey and sort other articles, including other agricultural as well as non-agricultural products. Although the depicted sorting apparatus 10 comprises a floor mounted device, sorting apparatuses embodying the invention can be provided in other configurations, such as ceiling-mounted sorting systems and wall-mounted sorting systems, for example.

The sorting apparatus 10 disclosed herein generally includes a first sorter 12, stabilization device 14, second sorter 16, and take-away device 18. Articles generally flow in a downstream direction within the depicted sorting apparatus 10. The downstream direction progresses from left to right in FIG. 1.

For example, first sorter 12 initially receives articles to be sorted. Stabilization device 14 is downstream of first sorter 12 and stabilizes sorted articles received from first sorter 12. Second sorter 16 is downstream of stabilization device 14 and operates to sort stabilized articles received from stabilization device 14. Take-away device 18 is downstream of second sorter 16 and is configured to exhaust or otherwise remove sorted articles from sorting apparatus 10 in accordance with the described embodiment.

A transport device 19 is located below first sorter 12 and is configured to receive some articles from the received articles. In an exemplary lettuce embodiment, such articles received by transport device 19 can comprise lettuce cores, foreign materials or other comparatively heavy articles which fall from first sorter 12 during sorting operations. Transport device 19 comprises a vibratory conveyor in one configuration configured to remove the received articles from sorting apparatus 10. Such articles received within transport device 19 may be discarded, resorted, processed, etc.

As illustrated in the embodiment of FIG. 1, first sorter 12 includes a base member 20, housing 22, plurality of resilient supports 24, and drive device 26. Base member 20 includes an excited frame 30 including two substantially parallel rails 32 (only one rail is shown) coupled with spaced legs 34. Spacers 36 may be provided intermediate respective legs 34 and rails 32 to isolate legs 34 and the floor from vibratory motions of drive device 26 translated to excited frame 30. Exemplary spacers 36 comprise springs or elastomeric materials, such as bushings.

Resilient supports 24 comprise springs in the disclosed embodiment and are coupled intermediate base member 20 and housing 22. Drive device 26 is disposed in force transmitting relation relative to base member 20 to impart vibratory movement to housing 22 in accordance with the described embodiment. Drive device 26 includes a motor 27 configured to vibrate a shaft 28 coupled with sorter housing 22. As set forth in the '535 patent incorporated by reference above and as described in detail below, vibration of shaft 28 and housing 22 provides movement of articles within housing 22 of sorter 12.

Figure 2:
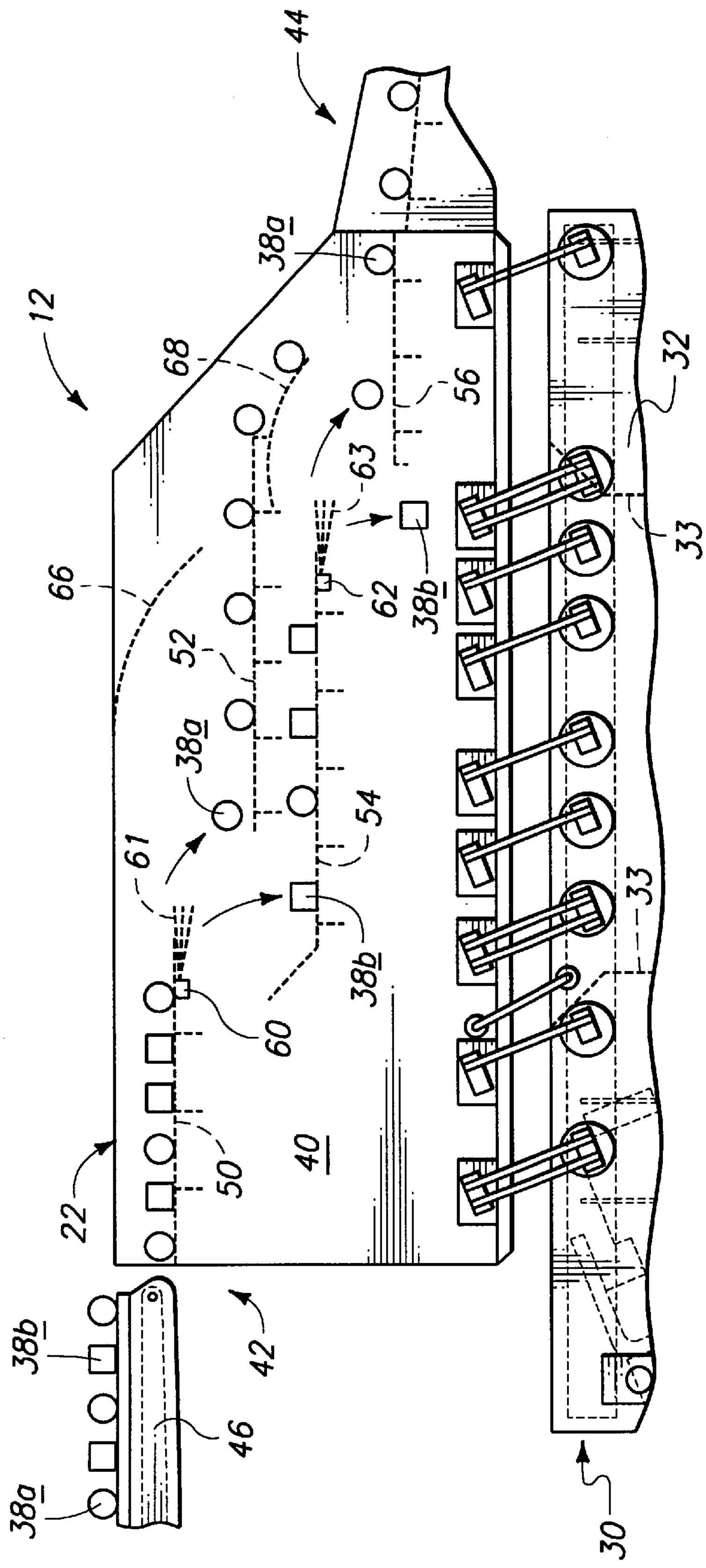
FIG. 2 is a schematic representation of an exemplary embodiment of a first sorter of the sorting apparatus shown in FIG. 1.

Referring to FIG. 2, internal components of housing 22 of one embodiment of sorter 12 are illustrated in detail. Housing 22 provides a substantially enclosed configuration which defines an inner cavity 40 in the disclosed arrangement. Housing 22 additionally defines an intake area 42 and an exhaust area 44 permitting ingress and egress of articles with respect to inner cavity 40. Intake area 42 includes an opening (not shown) positioned adjacent a feed conveyor 46 which is configured to deliver a plurality of articles 38*a*, 38*b* to be sorted.

Articles 38*a*, 38*b* are substantially sorted according to a product characteristic thereof during passage through sorter 12. Exemplary sorted articles 38*a* can be referred to as products belonging to one group while remaining articles 38*b* can be referred to as products belonging to another group. An exemplary product characteristic of articles 38*a*, 38*b* is the respective weight of the articles. For example, for a lettuce sorting application, an exemplary first group includes substantially light articles 38*a* such as leaves, while an exemplary second group includes comparatively heavier articles 38*b* such as cores or core material. The described sorter 12 is configured to sort articles 38*a* from articles 38*b*. Articles 38*a* belonging to a first group are generally represented as circles while articles 38*b* belonging to a second group are generally represented as squares.

In the depicted embodiment, sorter 12 is configured to receive articles 38*a*, 38*b* to be sorted through intake area 42. Exhaust area 44 is adjacent stabilization device 14 and is configured to output sorted articles 38*a* to stabilization device 14. Transport device 19 is configured to receive sorted articles 38*b* which fall from housing 22 as previously described. Guides 33 shown in FIG. 2 are provided intermediate rails 32 to direct articles 38*b* to transport device 19.

First sorter 12 is configured to move articles 38*a* within housing 22 in a given direction of movement from intake area 42 to exhaust area 44. Movement from intake area 42 to exhaust area 44 can be referred to as movement in the downstream direction. Articles 38*a*, 38*b* received from feed conveyor 46 move generally in a direction from left to right in FIG. 2.

First sorter 12 includes a plurality of sections within cavity 40 defined by housing 22. Such sections include an intake section 50, a bypass section 52, an intermediate section 54 and an exhaust section 56. Intake section 50, bypass section 52, intermediate section 54 and exhaust section 56 define a plurality of discrete, noncontinuous courses of travel for articles 38*a*, 38*b* within first sorter 12.

In particular, individual sections 50, 52, 54, 56 provide individual respective courses of travel. Sorter 12 is configured to direct the articles to be sorted along the discrete courses of travel from intake area 42 and intake section 50 to exhaust section 56 and exhaust area 44. Individual sections 50, 52, 54, 56 are coupled with the sidewalls of housing 22. As such, vibratory motion imparted to housing 22 from drive device 26 causes vibration of individual sections 50, 52, 54, 56. Such vibrations of sections 50, 52, 54, 56 operate to move articles 38*a*, 38*b* through first sorter 12 in the downstream direction.

Intake section 50 is configured to receive the plural articles 38*a*, 38*b* to be sorted and to define a substantially horizontal course of travel for the articles in accordance with the preferred embodiment. An air manifold 60 is positioned adjacent a downstream edge of intake section 50. As illustrated, air manifold 60 is positioned to emit an air stream 61 in a generally downstream direction parallel to the direction of movement of articles 38*a*, 38*b* upon intake section 50. In the depicted arrangement, air manifold 60 is configured to emit air stream 61 in a substantially horizontal direction.

During operation of first sorter 12, articles 38*a*, 38*b* move in the downstream direction and fall from the downstream edge of intake section 50 through air stream 61 emitted from air manifold 60 to substantially sort articles 38*a*, 38*b*. For example, air stream 61 emitted from manifold 60 sorts at least some of the articles from remaining articles and directs at least some of the articles from intake section 50 to exhaust section 56.

Articles 38*a*, 38*b* are substantially sorted according to a product characteristic of the individual articles during the passage thereof through air stream 61. In the described application, air stream 61 emitted from manifold 60 tends to direct articles 38*a* comprising lighter products (e.g., lettuce leaves) in a generally downstream direction from intake section 50 to bypass section 52. On the other hand, articles 38*b* comprising heavier articles (e.g., lettuce cores) tend to pass or fall through air stream 61 and land upon intermediate section 54.

For leafy product sorting applications, such a lettuce, air manifold 60 is preferably configured to emit an air stream 61 having a pressure within the approximate range of 35—45 psi to sort leaves from cores. Air manifold 60 can be configured to emit air stream 61 having other pressures. Air manifold 60 may be adjusted to deliver an air stream 61 or other fluids of other pressures in alternative embodiments.

Exhaust section 56 is located downstream of and elevationally below intake section 50. Intermediate section 54 is located downstream of and elevationally below intake section 50 and upstream of and elevationally above exhaust section 56. Bypass section 52 is located elevationally below intake section 50 and elevationally above intermediate section 54. Bypass section 52, intermediate section 54 and exhaust section 56 individually define a substantially horizontal course of travel for articles traveling thereon in accordance with the described embodiment. Intake section 50, bypass section 52, intermediate section 54 and exhaust section 56 can be individually adjusted (e.g., horizontally) to optimize sorting efficiency.

Bypass section 52 receives sorted articles 38*a* guided by air stream 61 of manifold 60. Bypass section 52 is arranged to direct such articles to exhaust section 56. Intermediate section 54 receives remaining articles which pass through air stream 61 emitted from manifold 60 as previously described. Although substantially most of the lighter articles 38*a* are directed to bypass section 52 by air stream 61 of manifold 60, some articles 38*a* fall through air stream 61 and land upon intermediate section 54 with heavier articles 38*b*. Thus, a second air manifold 62 is positioned adjacent a downstream edge of intermediate section 54 in the preferred embodiment to sort additional ones of articles 38*a* upon intermediate section 54 from remaining articles 38*b*.

More specifically, vibratory movement imparted to housing 22 urges articles 38*a*, 38*b* upon intermediate section 54 in a downstream direction. In one embodiment, manifold 62 is configured to emit an air stream 63 in a substantially downstream direction which is substantially horizontal and parallel to the downstream direction of movement of articles 38*a*, 38*b* upon intermediate section 54. Emission of air stream 63 by manifold 62 sorts at least some additional ones of articles 38*a* from remaining articles 38*b* received upon intermediate section 54. In addition, air stream 63 directs such additional articles 38*a* in the downstream direction from intermediate section 54 to exhaust section 56.

In the described embodiment, air stream 63 emitted from manifold 62 tends to direct the lighter articles 38*a* such as leaves, etc., to exhaust section 56 while heavier articles 38*b* such as cores fall through air stream 63 and out of housing 22 and land upon transport device 19 shown in FIG. 1. For utilization with leafy products, such as lettuce, air manifold 62 is preferably configured to emit an air stream 63 having a pressure within the approximate range of 35–45 psi. Air manifold 62 can be configured to emit air stream 63 having other pressures. Manifold 62 can be configured to deliver an air stream 63 or other fluids of other pressures in alternative embodiments.

The preferred embodiment of housing 22 includes a first guide 66 and a second guide 68 as illustrated in FIG. 2. Guide 66 is positioned to direct articles 38*a* sorted by air stream 61 to bypass section 52 and exhaust section 56. Guide 68 is provided beneath the downstream edge of bypass section 52 and is arranged to direct articles 38*a* received upon bypass section 52 to exhaust section 56.

Figure 3:
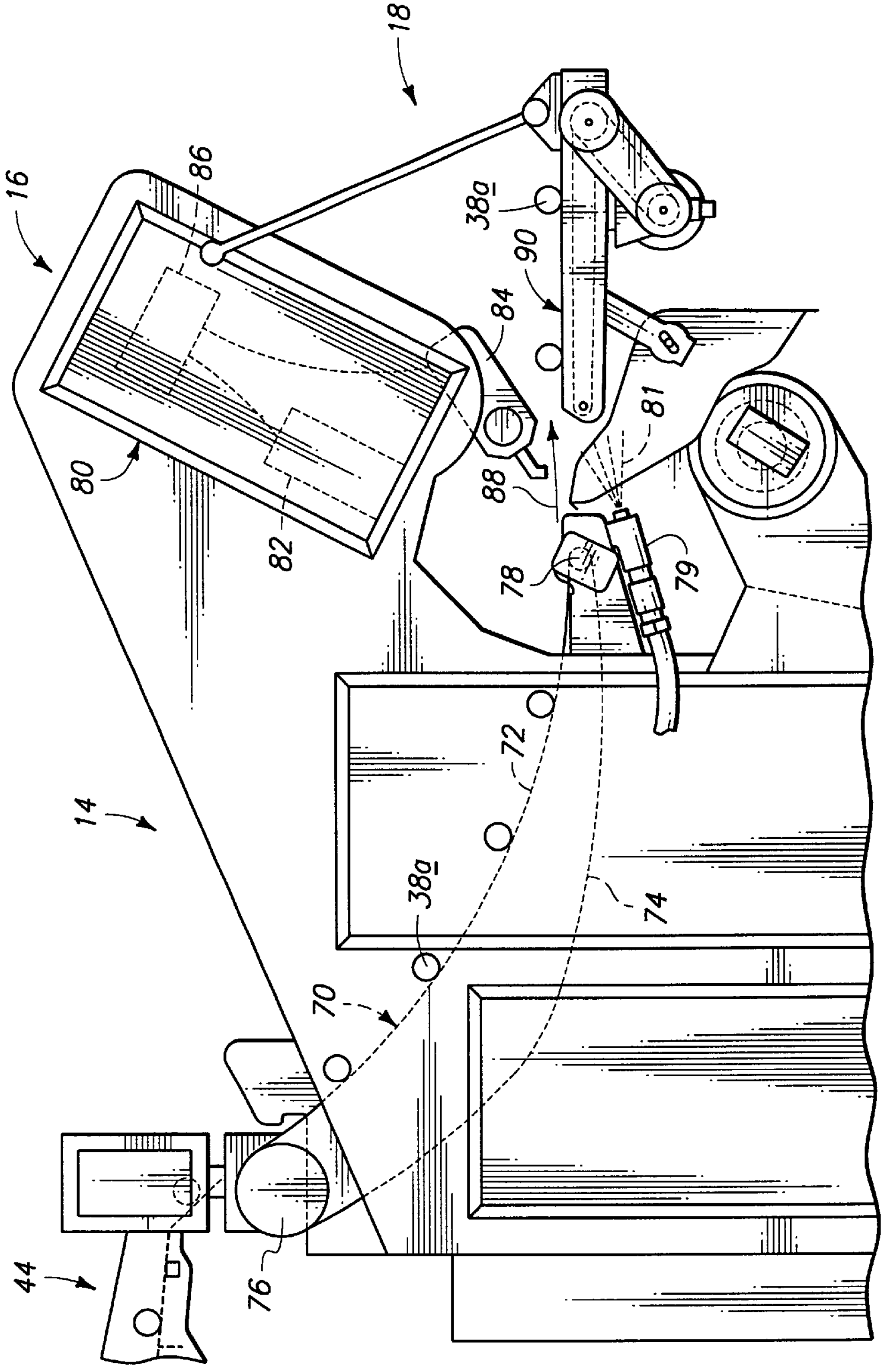
FIG. 3 is a schematic representation of exemplary embodiments of a stabilization device, second sorter, and take-away device of the sorting apparatus shown in FIG. 1.

Referring to FIG. 3, sorted articles 38*a* received from exhaust section 56 are directed through exhaust area 44 of housing 22 toward stabilization device 14. Stabilization device 14 is located downstream of first sorter 12 and is configured to stabilize the sorted articles 38*a* received from first sorter 12. An exemplary stabilization device 14 is described in detail in U. S. Pat. No. 5,713,456, incorporated herein by reference.

Stabilization device 14 includes a belt 70 including an upper flight 72 and a lower flight 74. A drive roller 76 provided adjacent an intake end of belt 70 is configured to drive belt 70 and upper flight 72 at a high speed (e.g., 400–800 feet per minute in an exemplary embodiment). A nose roller 78 defines an outfeed or exhaust end of belt 70. Rollers 76, 78 are positioned to provide a curved intermediate section of belt 70 having a progressively decreasing radius of curvature in the preferred embodiment to progressively increase centrifugal forces applied to articles 38*a* thereon. The described arrangement causes articles 38*a* being conveyed to remain substantially stationary or stabilized in a laterally-distributed arrangement upon belt 70. Such minimizes lateral movement of articles 38*a* relative to adjacent articles 38*a* as such articles are conveyed to nose roller 78 toward takeaway device 18.

Nose roller 78 preferably defines a substantially horizontal exhaust section of belt 70 adjacent the outfeed end of stabilization device 14 to assist in the gentle transfer of the stabilized articles 38*a* as such articles are propelled into free-flight along a flight path 88 towards second sorter 16 and take-away device 18.

An air manifold 79 is provided downstream of nose roller 78 and is oriented to emit an air stream 81 in a generally horizontal direction along the direction of travel of articles propelled from stabilization device 14 to urge such propelled articles along path 88. The emitted air stream 81 helps direct propelled articles to second sorter 16 and take-away device 18.

Air manifolds 60, 62, 79 can be implemented in a variety of configurations. Air manifolds 60, 62, 79 are configured to emit air or other gas in a predefined general direction. An exemplary configuration of individual air manifolds 60, 62, 79 is an air knife available from Exair Corporation having designation EXAIR-Knife. Other configurations of air manifolds 60, 62, 79 can be utilized.

Second sorter 16 is located downstream of stabilization device 14 and is configured to sort propelled articles 38*a* according to a second product characteristic, such as the optical quality of articles 38*a*. In an exemplary embodiment, second sorter 16 comprises an optical inspection and sorting station as described in U.S. Pat. No. 5,526,437, incorporated herein by reference.

The described second sorter 16 configured as an inspection station and sorting station includes a housing 80. Housing 80 contains an optical inspection component 82, such as a camera in the described embodiment. In addition, second sorter 16 also includes a product diverter 84. An exemplary product diverter 84 comprises an air manifold including a plurality of laterally-distributed air nozzles individually aligned with articles 38*a* moving along path 88. Further, second sorter 16 includes a computer processor 86 within housing 80 in accordance with the preferred embodiment. Inspection component 82 and product diverter 84 are coupled with internal processor 86 of second sorter 16 as illustrated. Processor 86 may be configured to execute automated sorting logic programs to implement sorting functions of sorter 16.

Is More specifically, inspection component 82 and product diverter 84 are positioned adjacent flight path 88 of articles 38*a* propelled from stabilization device 14 towards take-away conveyor 18. Inspection component 82 is positioned to view the stream of articles 38*a* propelled along flight path 88. Inspection component 82 provides optical characteristics or information of individual articles 38*a* to processor 86. In exemplary configurations, inspection component 82 comprises a color, monochrome or infrared sensitive camera.

Processor 86 executing the automated sorting logic program analyzes the received optical characteristics of individual ones of articles 38*a* . Processor 86 is configured via the programming to identify selected articles 38*c* to be sorted responsive to the optical characteristics of the articles. Product diverter 84 is configured to operate to sort the identified articles 38*c* responsive to control from processor 86. In accordance with the described embodiment, responsive to the execution of the automated sorting logic program using the optical information from inspection station 82, processor 86 instructs product diverter 84 to divert the selected ones of articles 38*c* from flight path 88 depending upon the individual optical characteristics.

Figure 4:
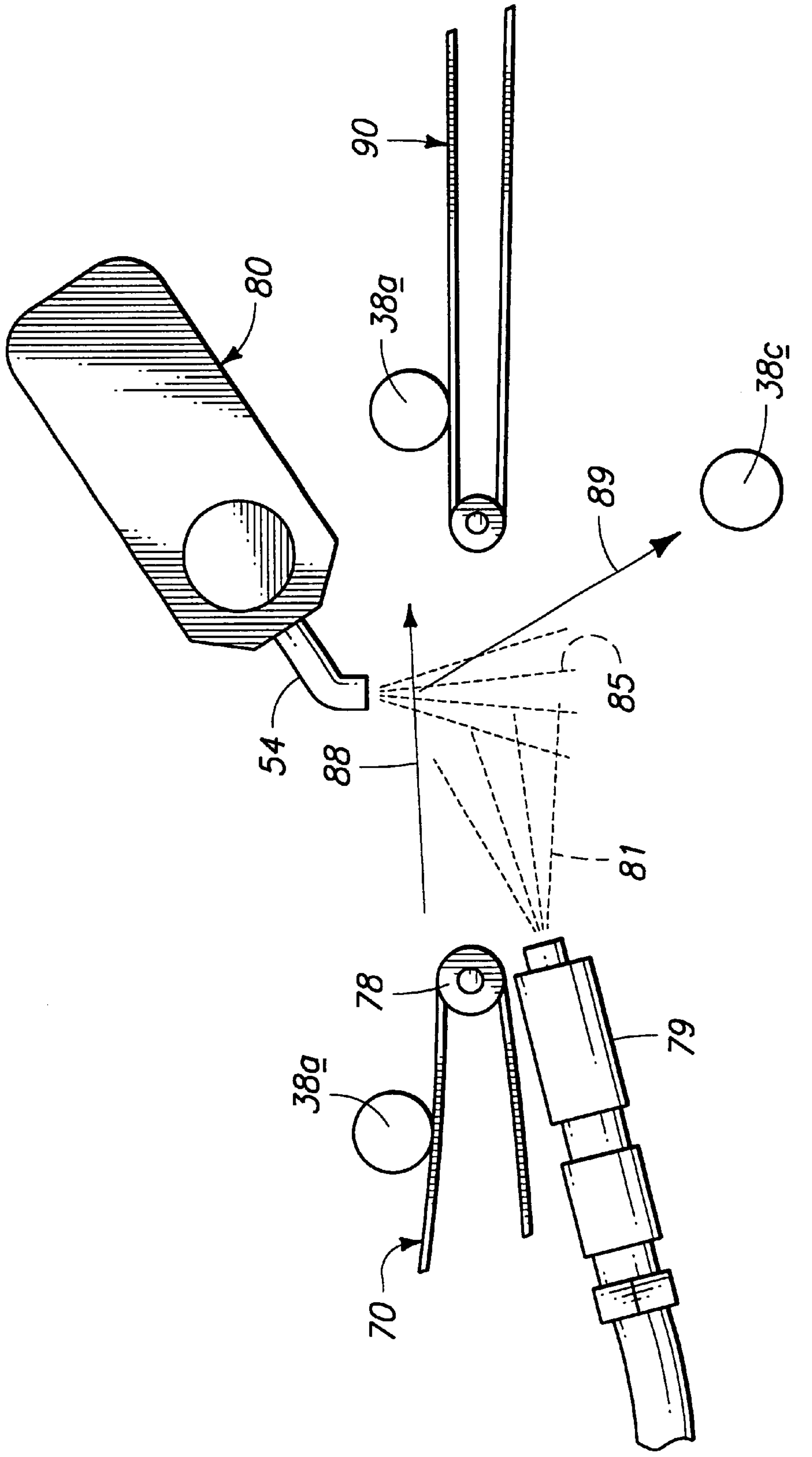
FIG. 4 is a schematic representation illustrating exemplary sorting operations of the second sorter.

Referring to FIG. 4, operations of product diverter 84 are described in detail. Product diverter 84 selectively emits an air stream 85 from an appropriate nozzle of the air manifold in a substantially downward direction to sort selected articles 38*c* propelled from stabilization device 14. Air stream 85 selectively emitted from product diverter 84 diverts selected articles 38*c* away from flight path 88 into a downward path 89 away from take-away device 18. Such diverted articles 38*c* can be subsequently discarded, re-inspected, processed, etc. Further details of the operations of the described second sorter 16 are provided in the '437 patent incorporated by reference above.

Nondiverted articles 38*a* continue along flight path 88 and are directed to take-away device 18. Take-away device 18 comprises a conveyor in the illustrated embodiment configured to receive the nondiverted articles 38*a*. Articles 38*a* received upon take-away device 18 are propelled by conveyor 90 in a downstream direction away from sorting apparatus 10 for further processing, packaging, etc.

In compliance with the statute, the invention has been described in language more or less specific as to structural and methodical features. It is to be understood, however, that the invention is not In limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A sorting apparatus comprising:

a first sorter configured to receive plural articles to be sorted and define a plurality of discrete courses of travel for the articles, the first sorter having an air manifold configured to emit an air stream intermediate adjacent courses of travel in a generally downstream direction to sort at least some articles according to a first product characteristic from remaining articles and direct the at least some articles intermediate adjacent courses of travel;

a stabilization device located downstream of the first sorter and configured to stabilize the at least some articles received from the first sorter;

a second sorter located downstream of the stabilization device and configured to sort at least some additional articles from the stabilized articles according to a second product characteristic; and a take-away device located downstream of the second sorter and configured to transport the at least some additional articles.

2. The sorting apparatus according to claim 1 wherein the first sorter includes an intake section and an exhaust section positioned to define discrete courses of travel for the articles.

3. The sorting apparatus according to claim 1 wherein the air manifold in configured to emit the air stream in a substantially horizontal direction.

4. The sorting apparatus according to claim 1 wherein the first sorter includes an intake section and an exhaust section positioned to define substantially horizontal courses of travel for the articles.

5. The sorting apparatus according to claim 4 wherein the exhaust section is positioned elevationally below the intake section.

6. The sorting apparatus according to claim 4 wherein the first sorter includes a drive device operable to impart vibratory movement to the intake section and the exhaust section.

7. The sorting apparatus according to claim 4 wherein the first sorter comprises:

an intermediate section located downstream of and elevationally below the intake section and upstream of and elevationally above the exhaust section, the intermediate section configured to receive the remaining articles from the intake section; and an air manifold adjacent the intermediate section and configured to emit an air stream in a generally downstream direction to sort at least some additional articles according to the first product characteristic from the remaining articles.

8. The sorting apparatus according to claim 1 further comprising an air manifold positioned adjacent the stabilization device and configured to emit an air stream to assist with the direction of the at least some articles from the stabilization device to the take-away device.

* * * * *

UNITED STATES PATENT AND TRADEMARK OFFICE

CERTIFICATE OF CORRECTION

PATENT NO. : 6,250,471 B1
DATED : June 26, 2001
INVENTOR(S) : Ruthven et al.

It is certified that error appears in the above-identified patent and that said Letters Patent is hereby corrected as shown below:

Column 7,
Line 62, please delete "Is".

Column 8,
Line 40, please delete "In" after "not".

Signed and Sealed this

Twenty-ninth Day of January, 2002

*Attest:*

JAMES E. ROGAN
*Director of the United States Patent and Trademark Office*

*Attesting Officer*